UNITED STATES PATENT OFFICE.

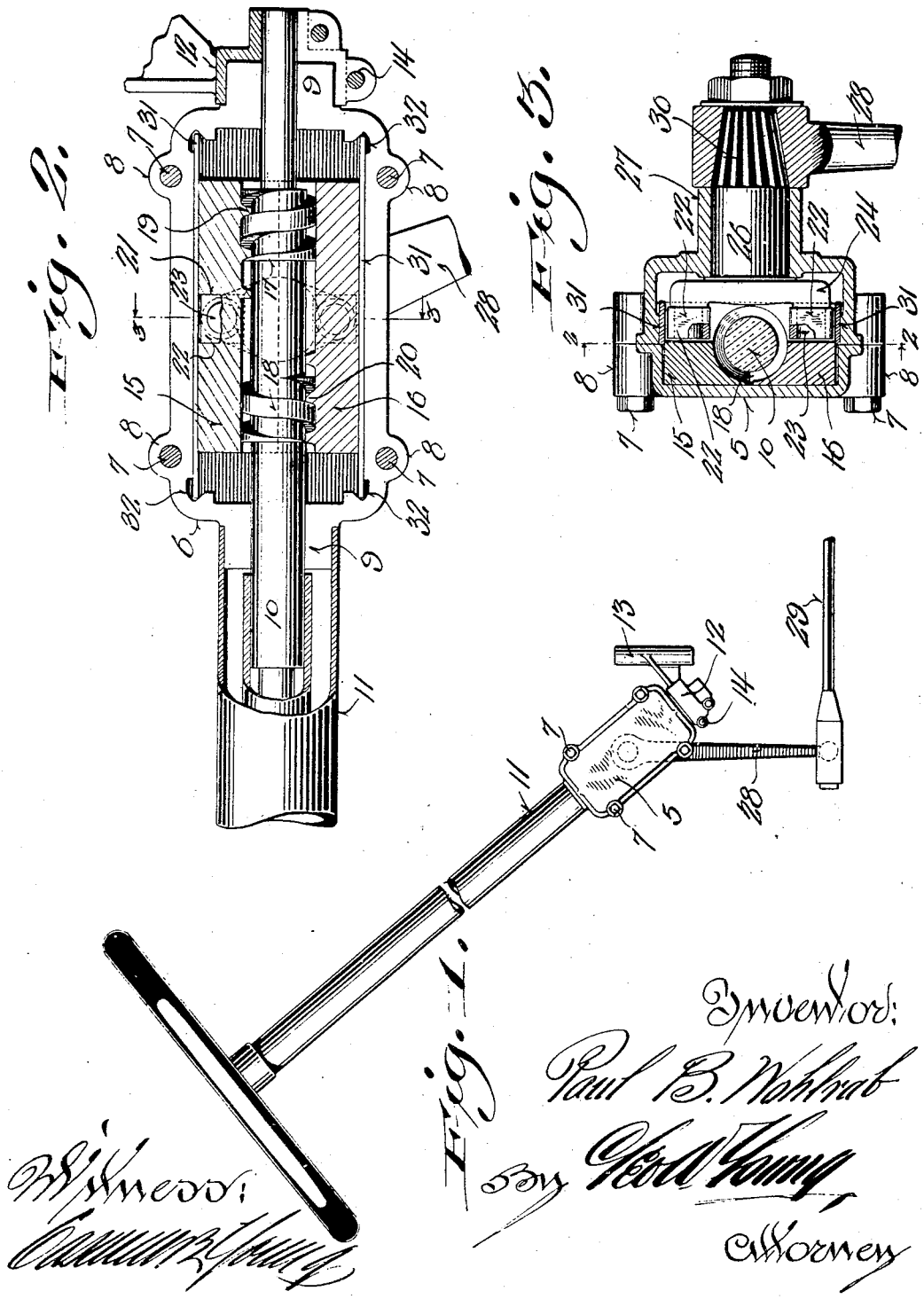

PAUL B. WOHLRAB, OF RACINE, WISCONSIN.

STEERING-SHAFT TRANSMISSION.

1,251,722.  Specification of Letters Patent.  Patented Jan. 1, 1918.

Application filed May 13, 1916.  Serial No. 97,238.

*To all whom it may concern:*

Be it known that I, PAUL B. WOHLRAB, a citizen of the United States, and resident of Racine, in the county of Racine and State of Wisconsin, have invented certain new and useful Improvements in Steering-Shaft Transmission; and I do hereby declare that the following is a full, clear, and exact description thereof.

The present invention relates to new and useful improvements in steering post transmission mechanisms for automobiles or other vehicles, and is more particularly directed to the provision of a transmission of that general type including a pair of oppositely slidable blocks connected with a rock shaft extending transversely of the steering post and provided respectively with right and left hand screw threads meshing with right and left hand threads on the steering post.

Structures of this type include intersecting right and left hand threads on a respective portion of a steering post which mesh with respective right and left hand threads at adjacent end portions of a pair of thread blocks, and with the other end portions of the thread blocks are slidably associated pintles carried by a transverse head of the wheel connected shaft. A serious disadvantage of this type of structure is that a binding tendency of the thread blocks is had upon operation.

A further disadvantage of this type of structure is that owing to the intersecting relation of the shaft threads, considerable lost motion is encountered. A third disadvantage is the relatively great cost of manufacture of a post provided with intersecting right and left hand threads.

Apart, however, from the disadvantages mentioned, a structure of the above type is highly desirable in view of the elimination of back motion transmitted to the steering post from the wheels and in view of the increased leverage afforded by oppositely movable screw blocks connected with a transverse rock shaft head. A further advantage is the exceeding compactness and simplicity of such a structure.

It is therefore the object of this present invention to provide a structure of the present nature wherein is overcome the disadvantage mentioned and it is more specifically an object to provide an arrangement wherein the right and left hand threads are so disposed relatively to the shaft and screw blocks as to distribute the strain of operation and to provide bearings for the blocks in a manner eliminating the binding tendency mentioned. A further object is to eliminate the lost motion occasioned by intersecting right and left hand threads. A third object is to substantially cheapen the cost of manufacture of structures of this nature.

With the above and other objects and advantages in view, the invention resides more particularly in the novel combination, arrangement and formation of parts more particularly hereinafter described, and pointed out in the appended claims.

Figure 1 is a side elevational view of a steering transmission embodying the present invention.

Fig. 2 is a vertical longitudinal view taken centrally through the transmission between the steering post and the transverse rock shaft, as indicated by the line 2—2 of Fig. 3.

Fig. 3 is a transverse sectional view through the transmission structure on the line 3—3 of Fig. 2.

Referring now more particularly to the accompanying drawings, the improved steering transmission mechanism includes a head casing including the side walls 5 and 6 respectively, having at their edges longitudinally turned top, bottom and end edge wall portions disposed together and secured by bolts 7 passed through transverse enlargements 8 thereon. The end walls are thickened and channeled to provide bearings 9 journally receiving the steering post 10 and one of these bearings fits within the lower end of the steering post casing 11 while the other bearing fits into a split sleeve 12 carried by a bracket 13 which is suitably secured to the body of the vehicle. This split sleeve has its outer bore portion reduced to substantially the diameter of the adjacent end of the steering shaft and the sleeve is clamped on the bearing by bolts 14 passed therethrough adjacent its split portions.

Slidably mounted in the casing above and below the steering shaft are thread blocks 15 and 16 respectively which have their opposed faces provided with longitudinal channels semi-circular in cross section and coacting to form a bore receiving the steering shaft. Portions of the shaft adjacent the ends of the thread blocks are provided with right and left hand male screw threads 17 and 18 respectively and coacting right and left hand female threads 19 and 20 respectively are formed in the channels of the blocks at opposite ends, and mesh with corresponding male threads of the post. The threads are of the square type and are of considerable width. Thus each of the series of male threads acts as a bearing collar for the end of the block other than that with which it is threadedly engaged. A bearing is thus provided for both ends of the blocks in conjunction with their thread engagement with the post.

Disposed transversely and centrally in the sides of the blocks adjacent the casing wall 6 are recesses 21 in which are slidably positioned rectangular bearing blocks 22, journally receiving pintles 23 at the ends of lateral arms 24 carried by a rock shaft 26 which is journaled in a sleeve 27 formed on the casing wall 6. The shaft projects outwardly of the sleeve and its projected end is of frustoconical shape and engageable in the frustoconical opening of a depending arm 28 which is suitably connected with a link 29 extending toward the steering wheels. The opening and the frustoconical shaft portions are provided with a series of coacting teeth 30 and thus the arm may be secured at any desired angle to procure proper steering operation of the wheels.

It is noted that there is considerable space between the series of threads 17 and 18 of the shaft, and thus as the thread blocks are oppositely moved, the pintles 23 may project inwardly into the channels of the thread blocks without interference. Thus provision is made for an exceeding compactness of structure, and although the bearing blocks of that type of structure including intermeshing right and left hand steering shaft threads, project also into the channels of the thread blocks, this arrangement prevents the possibility of procuring a bearing carried by the shaft for the adjacent ends of the thread blocks and thus an objectionable binding occurs in operation, due to lack of proper bearing for the thread blocks and due also to improper distribution of working strain. Inasmuch as in the present structure the pintles of the rock shaft are disposed intermediately of the threads, a distribution of working strain is procured which further eliminates objectionable binding tendency.

Also, by the separation of the steering shaft threads, a considerable economy of manufacture is effected and the objectionable lost motion incidental to the intersecting relation of the threads is eliminated.

To provide for holding the thread blocks in proper engagement with the steering shaft, spring strips 31 are disposed longitudinally in the casing between the outer faces of the blocks and the adjacent casing walls, and have their ends engageable in recesses 32 formed in the casing at the corners of the end walls. These strips have a normal tendency to bow inwardly and serve to a certain extent to take up lost motion due to wear.

Although the threads of the steering posts and blocks have been described as square threads in practice, I find that the use of an acme thread of twenty nine degrees is preferable for securing a proper take up between the posts and blocks.

What is claimed, is:

1. A steering gear transmission mechanism comprising a steering post, a casing surrounding one end of said post, two series of oppositely inclined screw threads on said post within said casing, a pair of independently movable blocks disposed in said casing and surrounding said screw threads, one series of threads being adapted to operate each block, relatively stationary leaf springs secured in said casing at opposite sides thereof for slidable engagement by said blocks to urge the latter toward said screw threads, and means connected with said blocks to be operated thereby.

2. A steering gear transmission mechanism comprising a steering post, a casing surrounding one end of said post, a pair of series of oppositely inclined screw threads on said post within said casing, a pair of independently movable blocks surrounding said series of screw threads and disposed within the casing, one of said blocks being operated by each series of screw threads, a pair of leaf springs, one being disposed between the outer face of each block and the adjacent wall of the casing, whereby to force said blocks into engagement with said screw threads, the opposite ends of said casing being provided with notches to receive the ends of said springs to hold the same in position, and means connected with said blocks to be operated thereby.

In testimony that I claim the foregoing I have hereunto set my hand at Racine, in the county of Racine and State of Wisconsin, in the presence of two witnesses.

PAUL B. WOHLRAB.

Witnesses:
E. M. CASKEY,
D. L. ROBERTSON.